US008576145B2

(12) United States Patent
Miller et al.

(10) Patent No.: US 8,576,145 B2
(45) Date of Patent: Nov. 5, 2013

(54) TONESCALE COMPRESSION FOR ELECTROLUMINESCENT DISPLAY

(75) Inventors: Michael E. Miller, Honeoye Falls, NY (US); Christopher J. White, Avon, NY (US)

(73) Assignee: Global OLED Technology LLC, Herndon, VA (US)

( * ) Notice: Subject to any disclaimer, the term of this patent is extended or adjusted under 35 U.S.C. 154(b) by 894 days.

(21) Appl. No.: 12/271,355

(22) Filed: Nov. 14, 2008

(65) Prior Publication Data

US 2010/0123648 A1 May 20, 2010

(51) Int. Cl.

| | |
|---|---|
| ***G09G 3/30*** | (2006.01) |
| ***G09G 3/20*** | (2006.01) |
| ***G09G 3/22*** | (2006.01) |
| ***G09G 5/00*** | (2006.01) |
| ***G06F 3/038*** | (2013.01) |
| ***H04N 9/69*** | (2006.01) |
| ***G03B 21/00*** | (2006.01) |

(52) U.S. Cl.

USPC ............ 345/76; 345/75.2; 345/204; 348/675; 353/31

(58) Field of Classification Search

USPC ........... 345/32, 75.2, 102, 104, 690; 348/675; 358/1.9, 3.27; 382/103, 170, 274; 353/70; 422/400; 506/39

See application file for complete search history.

(56) References Cited

U.S. PATENT DOCUMENTS

| | | | | |
|---|---|---|---|---|
| 4,338,623 | A | 7/1982 | Asmus et al. | |
| 6,313,878 | B1 | 11/2001 | Jankowiak | |
| 6,806,852 | B2 | 10/2004 | Ishizuka | |
| 6,856,328 | B2 | 2/2005 | Holtslag | |
| 7,826,640 | B1 * | 11/2010 | Yao et al. | 382/103 |
| 2002/0057234 | A1 | 5/2002 | Ishizuka et al. | 345/77 |
| 2003/0016881 | A1 * | 1/2003 | Matsuura | 382/274 |
| 2005/0184926 | A1 * | 8/2005 | Wada et al. | 345/32 |
| 2006/0055829 | A1 * | 3/2006 | De Haan | 348/675 |
| 2006/0232823 | A1 * | 10/2006 | Hooper | 358/3.27 |
| 2007/0182670 | A1 * | 8/2007 | Watanabe et al. | 345/75.2 |
| 2008/0068359 | A1 * | 3/2008 | Yoshida et al. | 345/204 |
| 2008/0100806 | A1 * | 5/2008 | Inazumi | 353/31 |
| 2008/0106491 | A1 | 5/2008 | Cok et al. | 345/36 |
| 2010/0080459 | A1 * | 4/2010 | Dai et al. | 382/170 |

FOREIGN PATENT DOCUMENTS

WO 2006/103629 3/2006

* cited by examiner

*Primary Examiner* — Quan-Zhen Wang

*Assistant Examiner* — Lin Li

(74) *Attorney, Agent, or Firm* — Global OLED Technology LLC

(57) ABSTRACT

A method for controlling an electroluminescent display to produce an image for display that has reduced luminance to reduce burn-in on the display while maintaining visible contrast, includes providing the electroluminescent (EL) display having a plurality of EL emitters, the luminance of the light produced by each EL emitter being responsive to a respective drive signal; receiving a respective input image signal for each EL emitter; and transforming the input image signals to a plurality of drive signals that have a reduced peak frame luminance value but maintains contrast in the displayed image to reduce burn-in by adjusting the drive signals to have reduced luminance provided by each pixel with the luminance decrease in a shadow range being less than the luminance decrease in a non-shadow range.

12 Claims, 9 Drawing Sheets

TONESCALE COMPRESSION FOR ELECTROLUMINESCENT DISPLAY

CROSS REFERENCE TO RELATED APPLICATION

Reference is made to commonly-assigned, co-pending U.S. patent application Ser. No. 12/271,321, filed concurrently herewith, entitled "Method For Dimming Electroluminescent Display" by Miller et al, the disclosure of which is incorporated by reference herein.

FIELD OF THE INVENTION

The present invention relates to electroluminescent display systems. Particularly, the present invention provides a method for dimming an electroluminescent display while maintaining shadow detail.

BACKGROUND OF THE INVENTION

Many display devices exist within the market today. Among the displays that are available are thin-film, coated, electroluminescent (EL) displays, such as organic light-emitting diode (OLED) displays. These displays can be driven using an active matrix or passive matrix back plane. Regardless of the technology that is applied, these display devices are typically integrated into a system that involves a controller for receiving an input image signal, converting the input image signal to an electronic drive signal and supplying the electronic drive signal to the electroluminescent display device which drives an array of emitters to produce light in response to the drive signal.

Unfortunately, as these emitters convert current to light they typically degrade and this degradation is a function of the current that is provided to each emitter. As such, the emitters that receive the most current degrade at a faster rate than emitters that receive less current. As the emitters degrade, they produce less light as a function of current. Therefore each emitter will likely have a different amount of degradation and this difference in degradation results in differences in luminance when the emitters are driven with the same current to produce a uniform image. As a result, inadvertent patterns are created when the display is turned on due to this difference in luminance uniformity. These patterns can be distracting and cause the display to be perceived by the end user as low in quality or, under extreme conditions, unusable.

Fortunately, in many applications, such as when displaying motion video, the image content is constantly changing and the current to every emitter is varied as a function of the image content. Therefore, the amount of current is relatively balanced across the emitters of the display over time and the differences in degradation and hence differences in luminance when displaying a uniform image is balanced, making this problem a non-issue. In the event that the video is paused or a single static image is displayed, the quality of the display can be degraded because the pattern of currents across the display are stationary with respect to the array of emitters.

This problem is not unique to OLED but instead arises in all known emissive displays, including CRTs and plasma displays, and can be exhibited by non-emissive displays, such as liquid crystal displays. One method that has been demonstrated to reduce this problem in the prior art is to detect the presence of a static image and reduce the peak luminance and therefore the current through each emissive display element in the display.

As an example of prior art for reducing the peak luminance, Asmus et al. in U.S. Pat. No. 4,338, 623, discusses a CRT display which includes a circuit for detecting a static image and a circuit for protecting the display by decreasing the brightness of the displayed image by decreasing the voltage at the cathode of the CRT. While this method satisfies the requirement that it will reduce the image stick artifact, the method provides a very rapid change in luminance, which will be quite noticeable to the user and by controlling the analog circuit in this fashion, there is little control of the appearance of the image after its luminance is reduced.

Similarly Jankowiak in U.S. Pat. No. 6,313,878, discusses a system which sums the red, green, and blue component signals in an input digital signal to detect the presence of a static image and then produces an analog signal to adjust a video gain on the display to reduce the luminance of the display in response to a static image. Once again, the method permits static images to be dimmed, however, by changing the gain value, there is little ability to control the appearance of the final image after its luminance is reduced.

Holtslag in U.S. Pat. No. 6,856,328, discusses detecting static regions in an image and reducing the intensity of only these areas in the image. Holtslag also discusses reducing the light intensity in a stepwise fashion to reduce the visibility of the change in luminance of the display. However, Holtslag does not describe a method for decreasing the light intensity and presumably reduces all of the intensities by a constant ratio to reduce intensity.

Ekin in WO 2006/103629, acknowledges that by simply dimming the display using methods, such as described by Asmus, Jankowiak or Holtslag, important image data can become invisible to the user. Ekin proposes a very complex solution to this problem that involves performing object detection to detect individual objects in a scene, calculating the contrast between the luminance of these objects and then reducing the luminance of these objects in a way as to maintain at least a minimum contrast between these objects in the scene. Unfortunately, the implementation of algorithms for object detection within a display driver is prohibitively expensive and does not provide a practical solution to maintaining the quality of the image as the luminance of the display is reduced to avoid image stick. Further, such methods are very difficult to employ in natural images, which have nearly continuous tonal levels and it is impossible to maintain adequate contrast between every tonal level such that the difference in tonal levels are visible.

Sony has recently marketed an OLED television referred to as the XEL-1. This display detects the presence of a static image and dims the display in the presence of a static image. While this dimming is performed very slowly so that the user is not aware that it is occurring, the images constantly lose shadow detail as the image is dimmed. Photometric assessment of this display shows that dimming such that the luminance is reduced by a constant ratio for all luminance values.

It is desirable to provide a method of dimming an EL display in a way that the user is unaware of the fact that the image is being dimmed. To accomplish this goal, it is important that as the image is dimmed in a way that information is not lost as the image is dimmed.

SUMMARY OF THE INVENTION

It is therefore an object of the present invention to dim an EL display while maintaining shadow detail. This is achieved by a method for controlling an electroluminescent display to produce an image for display that has reduced luminance to reduce burn-in on the display while maintaining visible contrast, comprising:

(a) providing the electroluminescent (EL) display comprising a plurality of EL emitters, the luminance of the light produced by each EL emitter being responsive to a respective drive signal;

(b) receiving a respective input image signal for each EL emitter; and (c) transforming the input image signals to a plurality of drive signals that have a reduced peak frame luminance value but maintains contrast in the displayed image to reduce burn-in by adjusting the drive signals to have reduced luminance provided by each pixel with the luminance decrease in a shadow range being less than the luminance decrease in a non-shadow range.

The present invention provides a low cost method for manipulating the luminance of a display without reducing the detail within a shadow range of the displayed images. This method permits the luminance of a display to be manipulated over a large range without a significant loss in image quality, enabling more rapid and larger dimming changes. By dimming EL displays in this way, the likelihood of image stick and power is reduced. The present invention recognizes that information is lost when dimming displays to reduce image stick because the function relating input to output luminance is typically linear while the human eye responds to light as a logarithmic detector.

DETAILED DESCRIPTION OF THE INVENTION

Figure 1:
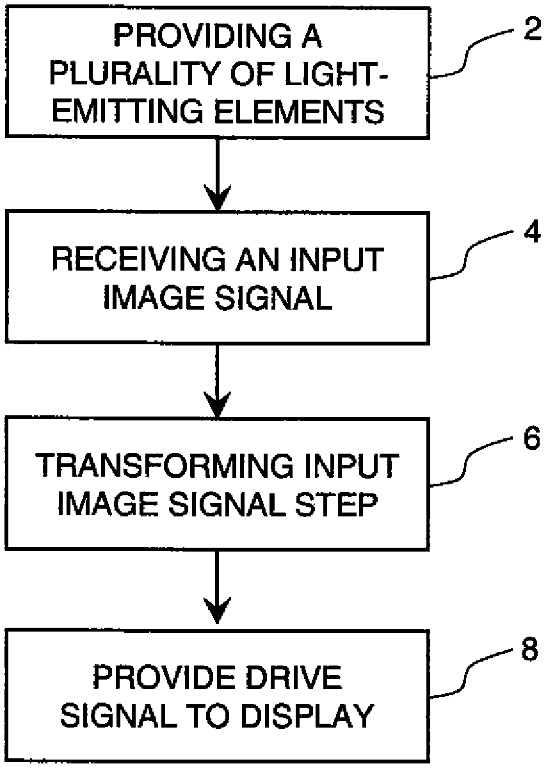
FIG. 1 is a flow chart showing the steps of a method of the present invention.

The need is met by providing a method for controlling an electroluminescent (EL) display system to produce an image for display that has reduced luminance to reduce burn-in on the display while maintaining visible contrast. This method includes the steps shown in FIG. 1. As shown in FIG. 1, an EL display including a plurality of EL emitters is provided 2 for emitting at least one color of light, the luminance of the light produced by each EL emitter being responsive to a respective drive signal. A respective input image signal is received 4 for each EL emitter. The input image signal is transformed 6 to a plurality of drive signals that that have a reduced peak frame luminance but maintain contrast in the displayed image to reduce burn-in by adjusting the drive signals to have reduced luminance provided by each pixel with the luminance decrease in a shadow range of the input image signals being less than the luminance decrease in a non-shadow range of the input image signals. For example, the shadow range can include input image signals at or below 5% of a maximum input image signal, and the non-shadow range can include input image signals above 5% of the maximum input image signal. This drive signal is then provided 8 to drive the display to provide an image with a reduced peak frame luminance but in which the luminance of the shadow range of the image is reduced less than the luminance of the non-shadow range.

This method can be enabled in a display system for receiving an input image signal and producing drive signals to control the display to produce an image with reduced luminance wherein the drive signals for EL emitters with a low input image signal, representing a shadow range in an image, reduced such that the luminance decrease for these EL emitters is less than the luminance decrease for high input image signals, representing the non-shadow range in the image.

Figure 2:
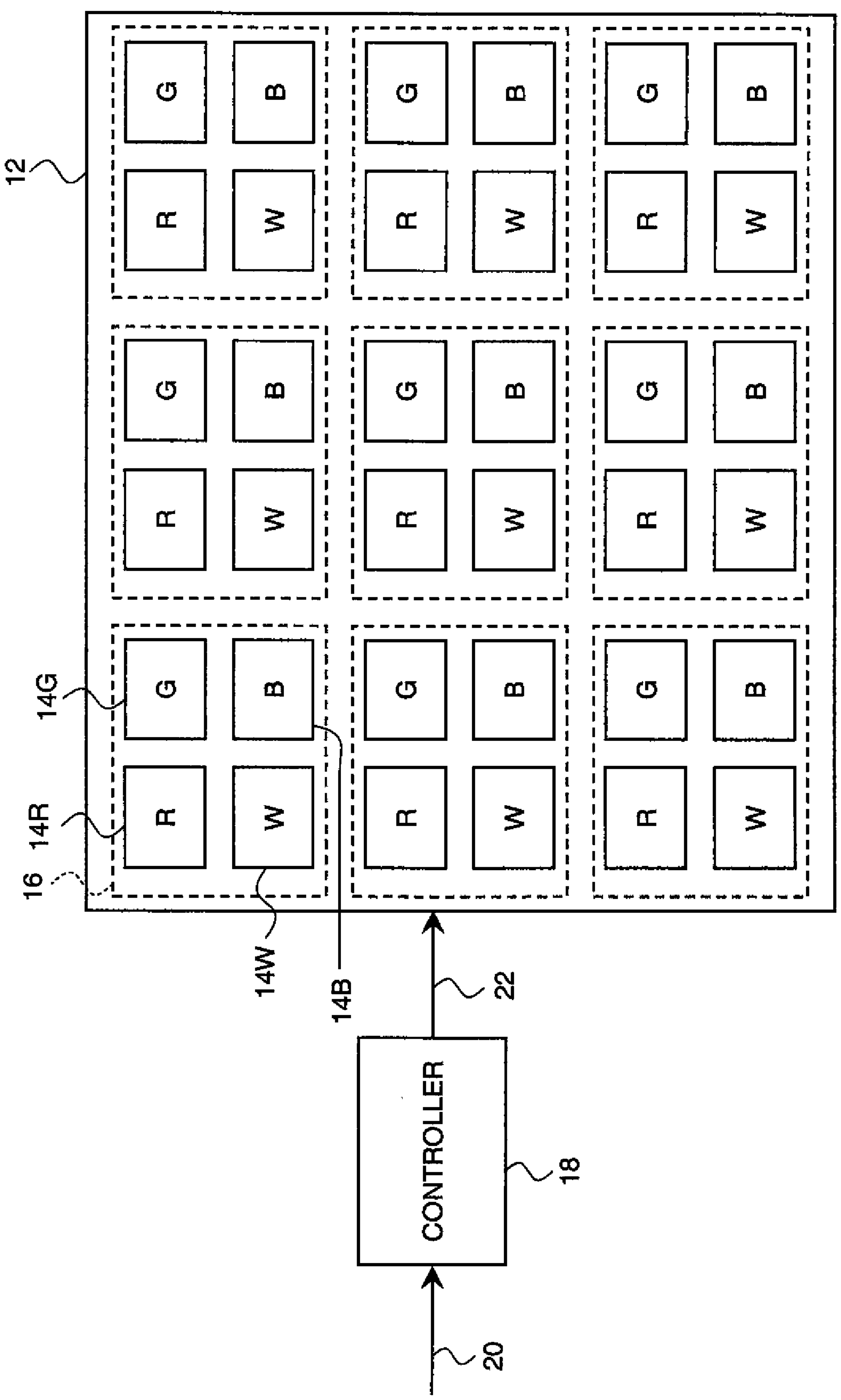
FIG. 2 is a schematic diagram of a system useful in practicing the present invention.

Referring to FIG. 2, an EL display system can include an EL display 12, which has an array of EL emitters such as 14R, 14G, 14B, and 14W for producing light in response to a drive signal. This array of emitters can include pixels 16 which are formed from repeating patterns of EL emitters for producing different colors of light. For example, this array of EL emitters can include repeating patterns of red 14R, green 14G, blue 14B and white 14W EL emitters, wherein each combination of these EL emitters are capable of forming a color image. The array of EL emitters can alternatively include individual EL emitters which all produce the same color of light or any number of differently colored EL emitters for producing different colors of light. The EL display system can further include a controller 18. The controller 18 receives an input image signal 20 for each EL emitter processes the input image signal 20, and provides a drive signal 22 to the EL emitters 14R, 14G, 14B, 14W of the EL display 12.

In response to drive signal 22, the EL display 12 produces a lower luminance than it does in response the input image signal 20. The luminance decrease in the shadow range is less than the luminance decrease in the non-shadow range.

Figure 3:
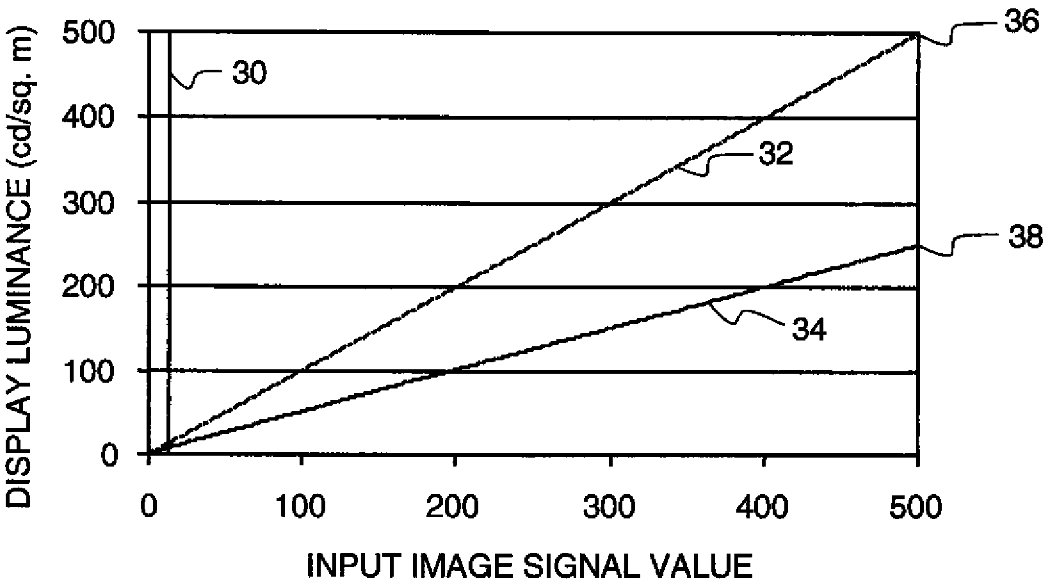
FIG. 3 is a graph showing a first and a second distribution of luminance values according to an embodiment of the present invention.

Referring to FIG. 3, there is shown an example of the input-output relationship of the controller, hereinafter referred to as a "contrast function." The abscissa represents input image signal values from 0 to 500. The ordinate represents the luminance provided by the EL display 12 in response to the drive signal 22. As shown, the EL display 12 is assumed to be capable of providing a maximum display luminance of 500 cd/m$^2$. For example, when the controller 18 does not apply a transformation to the input image signal 20, their input-output relationship is linear contrast function 32.

Within the context of the present invention, a "frame" refers to a single input image signal for each subpixel, permitting update all of the drive signals necessary to provide a single refresh of the EL elements on the EL display 12, and to the corresponding drive signals. Each frame is displayed with a corresponding peak frame luminance value. This peak frame luminance value can represent the luminance produced by a display driven with a drive signal value corresponding to a maximum input image signal value. For linear contrast function 32, the peak frame luminance value 36 is 500 cd/m$^2$. In this example, point 36 is also the maximum display luminance value: the maximum luminance the display can produce, as configured and under selected conditions. The present invention reduces the peak frame luminance value below the maximum display luminance value while maintaining shadow detail, so the peak frame luminance value is always less than or equal to the maximum display luminance value.

According to the present invention, the controller 18 processes the input image signals 20 for a frame to produce drive signals 22 having a reduced peak frame luminance value. For example, contrast function 34 has a peak frame luminance value 38 of 250 cd/m$^2$, which is lower than the peak frame luminance value 36 (500 cd/m$^2$) of linear contrast function 32.

According to the present invention, when the display luminance is decreased by changing the contrast function (e.g. from 32 to 34), the luminance is decreased less in the shadow range than in the non-shadow range. In FIG. 3, a demarcation line 30 separates the shadow range of the input image signal values from the non-shadow range of the input image signal values. The input image signal 20 values at or below the demarcation line 30 (in the shadow range) are transformed such that they are reduced by a first proportion, and the input image signal 20 values above the demarcation line 30 (in the non-shadow range) are reduced by a second, smaller proportion.

Figure 4:
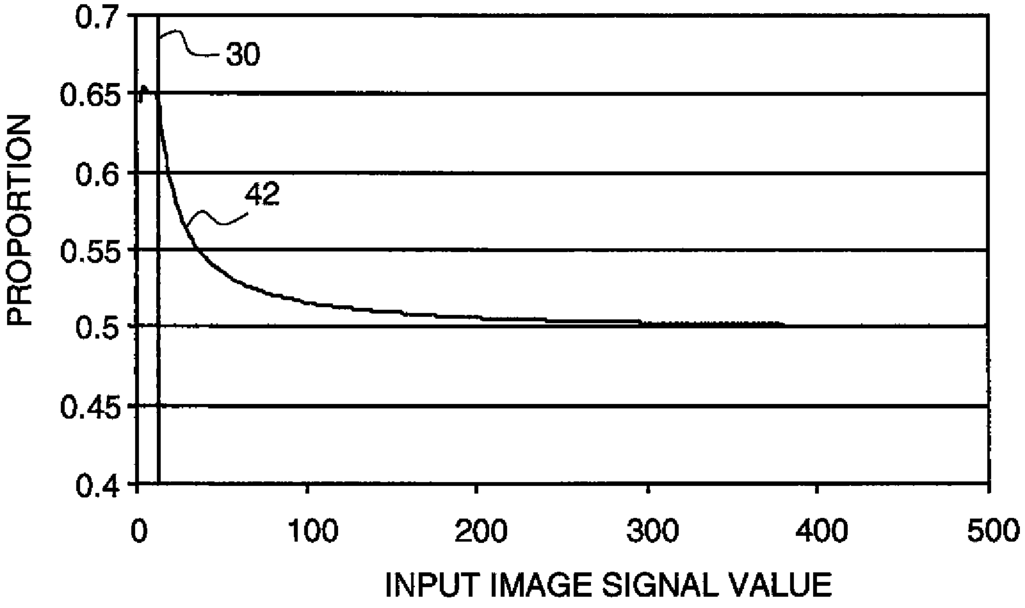
FIG. 4 is a graph showing the ratio of the second distribution to the first distribution shown in FIG. 3.

FIG. 4 shows a proportion 42 that is obtained by dividing the contrast function 34 in FIG. 3 by the linear contrast function 32, with the y-axis of this figure representing the proportion 42 and the x-axis of this figure representing the input image signal value of the first frame. As shown, this proportion is near 0.65 for very low input image signal values and decreases to near 0.5 for large input image signal values. This proportion 42 follows a nonlinear curve with the largest proportions occurring for input image signal values of 10% or less of the entire luminance range. By using a larger proportion 42 for smaller input image signal values (and, correspondingly, lower display luminance values) than for larger input image signal values (and, correspondingly, larger display luminance values), the luminance is reduced less in the shadow range (i.e., the range having a low relative luminance) of resulting images than in the non-shadow range. If the human eye responded linearly to this change in luminance, the shadow range of the image would appear brighter and the remainder of the image would be reduced in contrast. However, because the human eye is a logarithmic detector, this method maintains the shadow detail in an image that would otherwise be lost while maintaining acceptable contrast throughout the remainder of the image.

The present invention displayed images rendered using a contrast functions 32 and 34 on an OLED display and determined that the use of a variable proportion as a function of luminance value wherein the proportion is higher for low luminance values than for high luminance values results in an image with superior image quality and clearer shadow detail than is obtained using a fixed proportion. This experiment also demonstrates, however, that if the proportion is too large or if values are increased for more moderate display luminance values, the image loses apparent contrast and objects, especially faces, lose perceived color saturation. Therefore, it is preferable to define the shadow range to include input image signal values corresponding to display luminance values <=20% of the peak frame luminance, and more preferably <=10% of the peak frame luminance.

Figure 5:
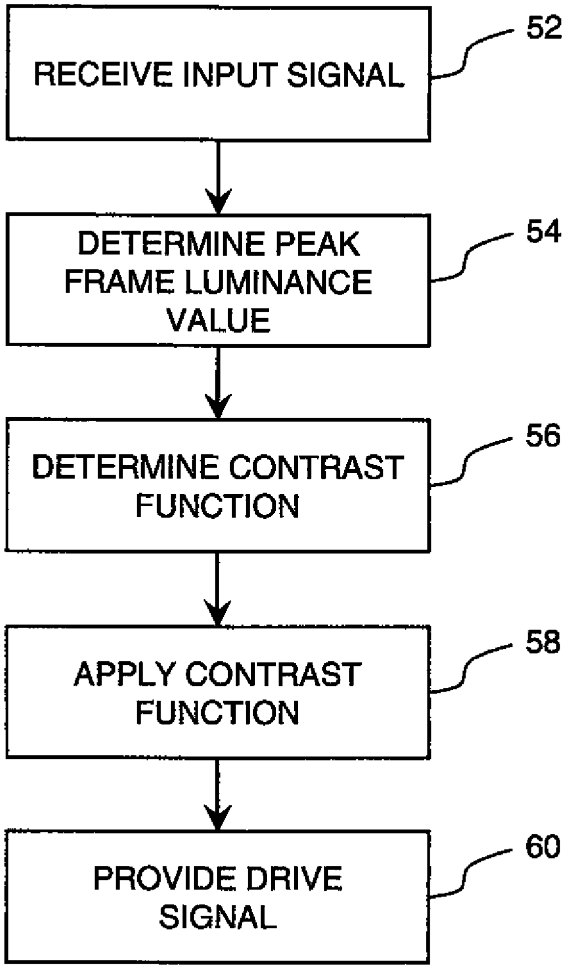
FIG. 5 is a flow chart showing the steps of an image processing method of the present invention.

Referring to FIG. 5, according to one embodiment of the present invention, the controller 18 can receive 52 an input image signal 20 having a defined maximum intensity value. The controller 18 determines 54 a peak frame luminance value. The controller 18 then determines 56 a contrast function, a transform mapping the input image signal to a drive signal as a function of the peak frame luminance value. The controller then applies 58 the contrast function to the input image signal to obtain an output image signal. The controller then provides 60 a drive signal 22 to the display that is based upon the output image signal. The contrast function can be a nonlinear function for reducing the input image signal corresponding to display luminance values of 0.2 times the peak frame luminance value by a first proportion and reducing the input image signal corresponding to display luminance values less than 0.05 times the peak frame luminance value by at least a second proportion, which is larger than the first proportion.

The peak frame luminance value can be determined 54 in a number of ways and can be dependent upon a number of factors. For example, a peak frame luminance value can be determined based upon an estimate of the current required to present an input image signal 20. That is, the current required to present the input image signal 20 with no reduction in peak frame luminance can be estimated and if this required current is too high, the peak frame luminance value can be decreased. One method for performing such a manipulation has been described in U.S. Patent Application Publication No. 12007/0146252. In another method for determining 54 the peak frame luminance value, this value can be computed based upon the response from a thermometer that provides an estimate of the temperature of the display. This method could decrease the peak frame luminance value in response to rapidly-increasing or high temperature values.

The peak frame luminance value can preferably be determined based upon the time that a static image is presented on the display 12. The peak frame luminance value can alternatively be determined based upon a combination of two or more of the factors mentioned previously or other additional factors.

Figure 6:
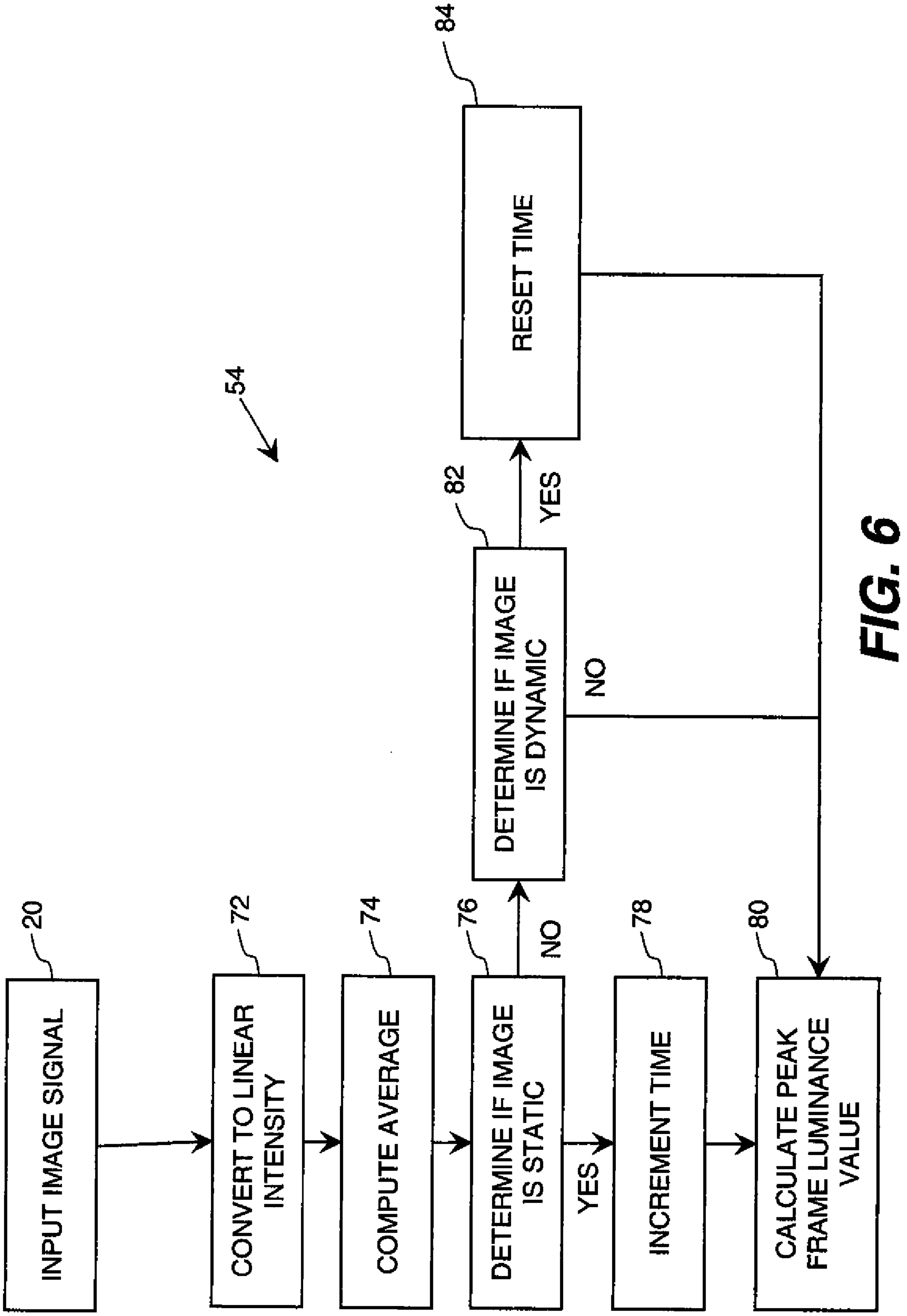
FIG. 6 is a flow chart showing a method for calculating a peak frame luminance value.

To provide a specific example, the controller 18 can determine 54 the peak frame luminance value based upon the time that a static image is presented on the display by applying the steps shown in the flow chart of FIG. 6. As shown in FIG. 6, the input image signal 20 is converted 72 into linear intensity values, for example using a nonlinear scaling and a matrix rotation according to a display standard such as ITU-R BT.709.

The average linear intensity value will then be computed 74 for each frame of data in the input image signal. The average linear intensity value is compared to an average linear intensity value for a previous frame in the input image signal. Through this comparison, it will be determined 76 if the image is static. If there is very little change (typically less than 1% change) in the average intensity value between the previous and present frame of data, a static image can be assumed. If the image is determined to be static, the time that the image has been static is incremented 78.

A peak frame luminance value is then calculated 80. This peak frame luminance value will typically be dependent upon the status of the counter that was incremented during step 78. This peak frame luminance value can be determined based upon the following equations:

$$L_f = L_d \times A(f) \quad \text{(Eq. 1)}$$

$$A(f) = \begin{cases} M & \text{for } f < i \\ M * ((1 - h_s)k_s^{(f-i)} + h_s) & \text{for } f >= i \text{ and } f <= F_s \\ M * \left((A(F_s) - h_t)k_t^{((f-i)-(F_s+1))} + h_t\right)_s & \text{for } f > F_s \end{cases} \quad \text{(Eq. 2)}$$

In Eq. 1, $L_f$ is the peak frame luminance (e.g. 38 of FIG. 3). $L_d$ is the maximum display luminance value (e.g. 36). A(f) is a proportion of maximum luminance which is >=0 and <=1. In Eq. 2, M is a selected maximum proportion, for example 1. The value f is the time that was incremented in step 78. This value is typically incremented as each frame of data is input and therefore this value will typically indicate the number of static frames since the last motion frame was detected in the input image signal value. In practice, this equation implements a function that permits the maximum peak frame luminance to be held constant for i frames after a static image is displayed. The maximum peak frame luminance is then decreased as an exponential function of the additional time up until $F_s$. Once $F_s$ is achieved, the maximum peak frame luminance is decreased as the function of a second exponential function. The values $k_s$ and $k_t$ represent constants between 0 and 1, which control the sharpness of the each of the two exponential functions. The values $h_s$ and $h_t$ represent the minimum value that each of the exponential values can attain.

For a typical OLED having a peak luminance of around 200 cd/m$^2$, the values in Table 1, were found to create desired behavior from an experimental display system.

TABLE 1

| Parameter | Values for Display with 60 Hz Update Rate |
|---|---|
| $k_s$ | 0.9985 |
| $k_t$ | 0.9997 |
| $h_s$ | 0.8 |
| $h_t$ | 0.4 |
| $F_s$ | 10800 |

Returning to the discussion of FIG. 6, if a static image is not determined to exist, the average computed in step 74 for a frame is compared to the average for a previous frame to determine 82 if the image is dynamic (or undergoing motion). If the difference is not sufficiently large (i.e. not greater than e.g. 1%), the image is not found to be dynamic. Under this condition, the timer can maintain a constant value or be incremented. If the image is determined 82 to be dynamic, the time can be reset 84 to zero and the peak frame luminance value calculated 80 to reset the proportion of maximum luminance to its maximum value, for example 1. By calculating 80 the peak frame luminance value in FIG. 6, the peak frame luminance value in FIG. 5 is determined 54.

A contrast function is then determined 56. This contrast function will ideally be continuous and smooth as a function of both input image intensity value and the peak frame luminance value. This function could be implemented by transforming the input image signal that was received 52 into a logarithmic space, performing a linear manipulation and converting from the logarithmic space to linear intensity. By performing such a manipulation, the contrast function will provide a nonlinear function for reducing the input image signal for input image signal values larger than 0.2 times the maximum intensity value by a first proportion and reducing the input image signal for input image signal values less than 0.05 times the maximum intensity value by at least a second proportion, which is larger than the first. This method will provide the desired function, but is generally expensive to implement in an FPGA or ASIC. An alternative would be to form a family of power functions with each power function corresponding to different aim intensity. However, this approach can again be expensive to implement within an FPGA or ASIC.

Figure 8A:
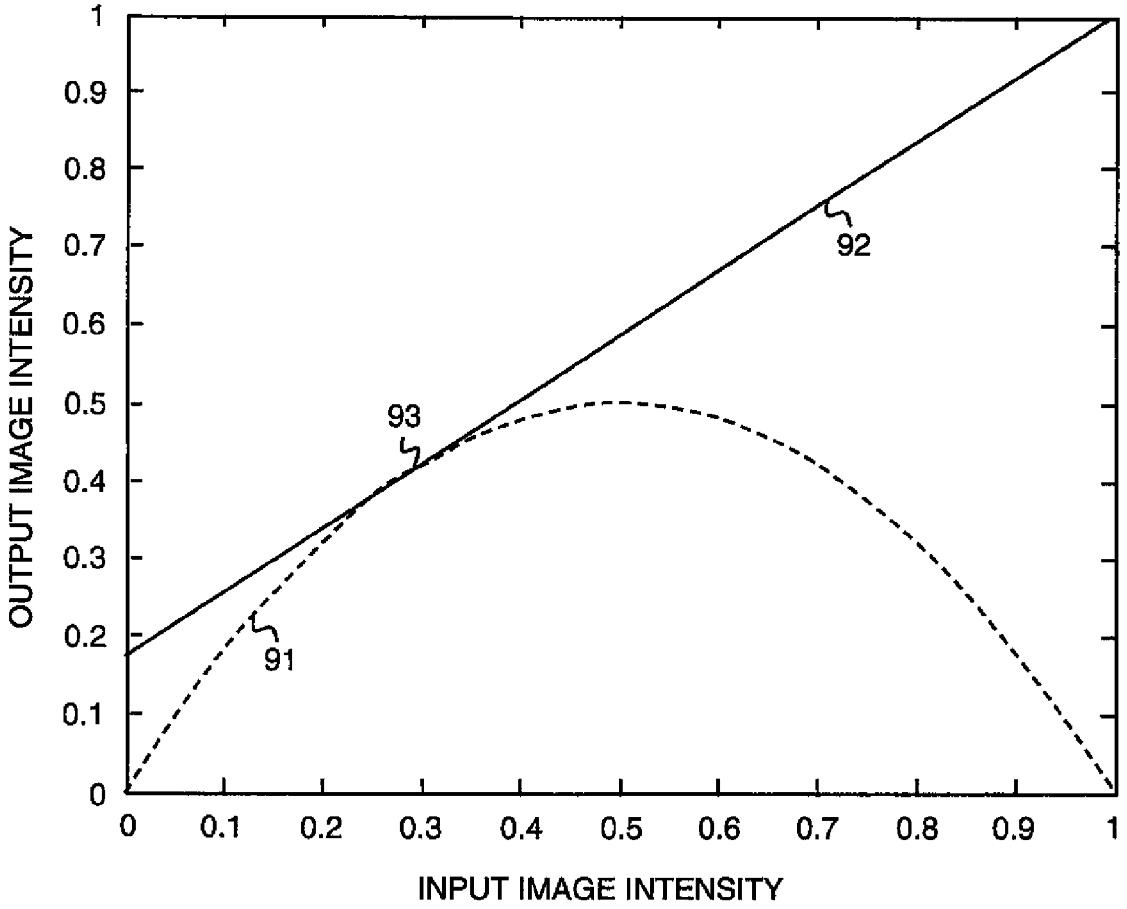
FIG. 8A is a graph showing a two-part contrast function according to an embodiment of the present invention.

Referring to FIG. 8A, a less expensive approach is to use a two-part curve that includes both a portion of a parabolic function, providing a nonlinear transform for low code values, and a linear transform for higher code values. Such a function can enable the EL emitters of the display to produce a peak frame luminance value wherein the contrast function is linear for luminance values greater than 20% of the peak frame luminance value and nonlinear for values less than 5% of the peak frame luminance value. As such, the contrast function includes a first and second sub-function. The first sub-function 91 is used to transform input image signals in the shadow range and the second sub-function 92 is used to transform input image signals in the non-shadow range. Therefore, the first sub-function is a quadratic polynomial and the second sub-function can be linear.

Such two-part functions are generally not desirable for such contrast functions since any discontinuity between the two sub-functions can result in significant imaging artifacts, such as contouring. However, these two sub-functions can be combined since the parabolic function provides a large number of instantaneous slopes. If the line is tangent to the parabola, e.g. at tangent point 93, the instantaneous slope of the parabola at the connection point will match the slope of the line, avoiding any discontinuity. In this case both the contrast function and its first derivative are continuous.

The step of determining 54 peak frame luminance value can provide a proportion of the maximum luminance. This proportion will decrease over time when a static image is displayed and can be any value between 1 and a proportion greater than zero. This proportion defines the peak frame luminance value by defining the drive signal at an input image intensity value of 1, defining one point on the linear portion of the function (denoted as $x_1$, $y_1$). This point provides the maximum output image intensity value.

In the current transform, the parabolic portion of the tone scale will be constrained to intersect the origin of the desired transform relating input image intensity to output image intensity and is constrained to provide positive output image intensity values in response to positive input intensity values. This constraint limits the parabola to equations of the form:

$$Y_{parab}=ax^2+bx. \quad \text{(Eq 3)}$$

Applicants have determined parabolas of this form provide visually-acceptable contrast function. With these constraints and having known values for a and b, it is possible to determine the slope of the linear portion, the coordinates of the tangent point and an offset for the linear portion. Having this function, all parameters for a contrast function composed of a parabolic sub-function and a linear sub-function can be computed. However, these parameters are not fixed but instead must be varied as a function of the peak frame luminance value to permit the display to be dimmed smoothly among peak frame luminance values while varying the shape of the contrast function as a function of the peak frame luminance value. A range of parameter values can be stored in a lookup table (LUT), or computed. The use of these functions for a and b permit relatively significant changes in the perceived luminance of the shadow range to be provided without losing saturation or contrast within areas of an image containing flesh.

Figure 7:
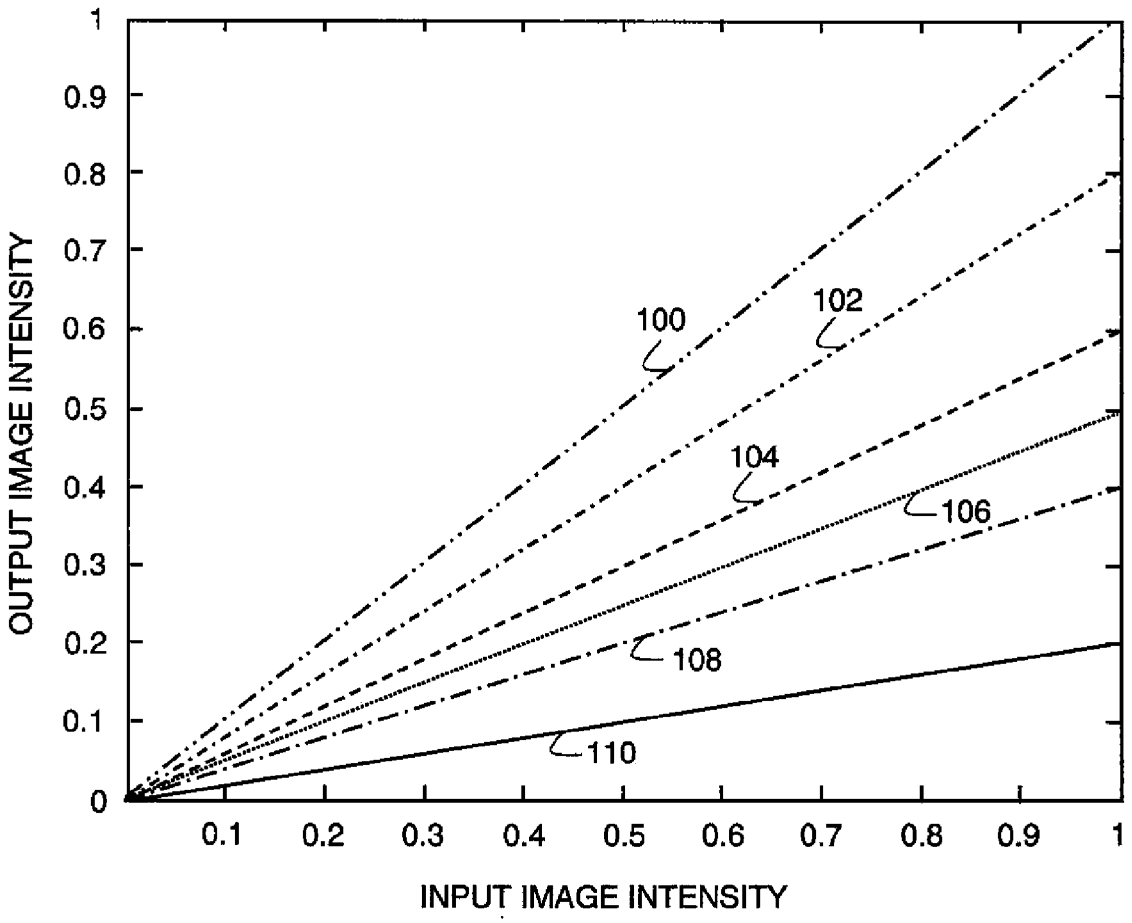
FIG. 7 is a graph showing a family of contrast functions for transforming the input image signal to produce an image on a display as a function of aim intensity value.

FIG. 7 shows a linear contrast function 100 and a family of nonlinear contrast functions 102, 104, 106, 108, 110 that can be generated for peak frame luminance values of 1.0, 0.8, 0.6, 0.5, 0.4 and 0.2 respectively, where the maximum display luminance value is 1.0. Note that these contrast functions can appear to be very near linear. However, they are actually include two sub-functions, including a parabolic sub-function for low input image intensity values and a linear sub-function for the remainder of the input image intensity values. Therefore, these contrast functions diverge from linear for proportions of maximum luminance less than 1 and for low code values where the human eye is most sensitive to changes in luminance.

Figure 8B:
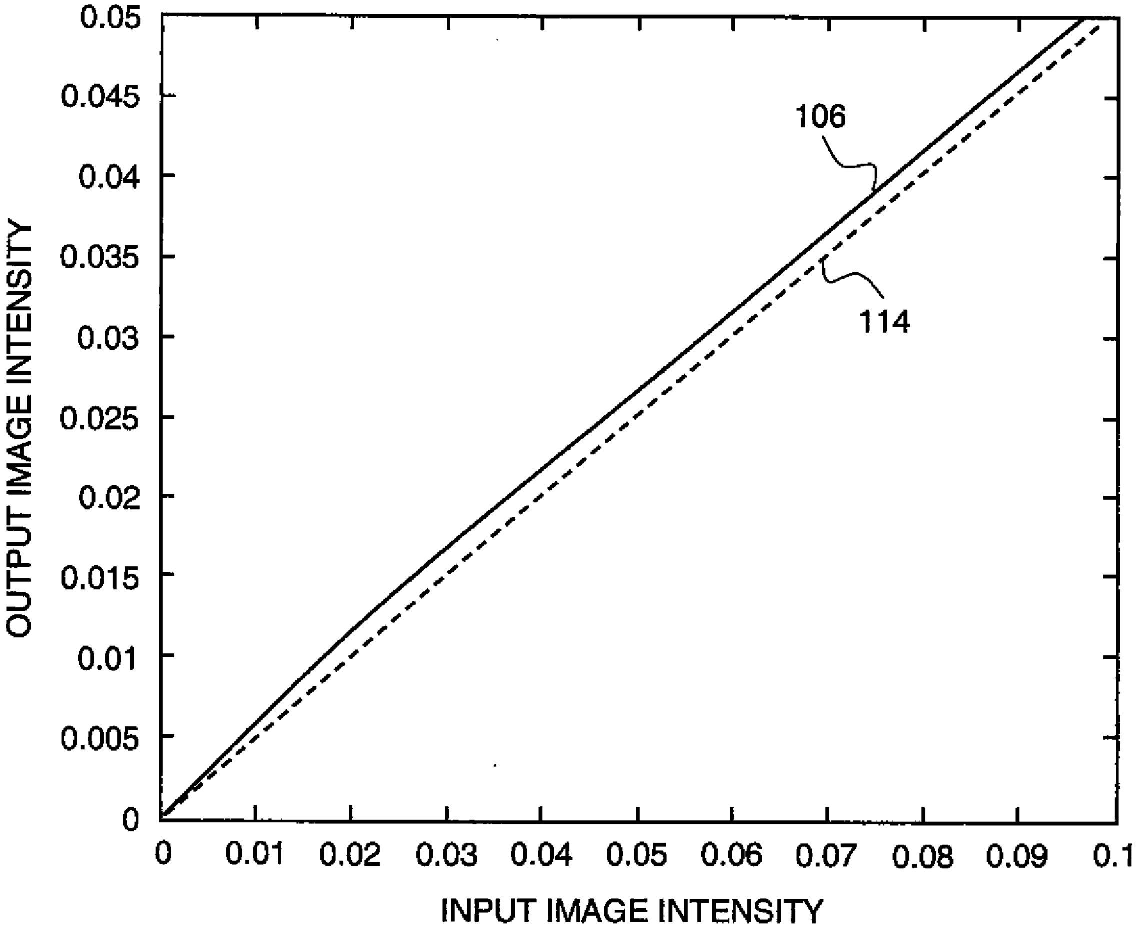
FIG. 8B is a graph showing a portion of a contrast functions according to the present invention compared to a prior art method.

FIG. 8B shows a portion of the contrast function 106 corresponding to a proportion of the maximum luminance equal to 0.5, represented as a solid line. A portion of a linear transform 114 as known in the prior art for y1 equal to 0.5 is also shown. Note that these two curves diverge from each other for low input image intensity values as the nonlinear contrast function 106, permitting the output image intensity values to be increased more rapidly than can be achieved for a linear function with the same proportion of maximum luminance. The use of this nonlinear contrast function permits shadow detail to be maintained in the image as the peak frame luminance value is reduced.

Referring back to FIG. 5, once the contrast function is determined 56, this contrast function can be applied 58 to the input image signal to create a transformed image signal. This transformed image signal can then be modified using a relationship from linear intensity to display code value to create a drive signal, which can be provided 60 to the drive the display.

An attribute of this nonlinear transform is that the instantaneous slope at low input image intensity values can become larger than for the original image. This change can result in two potential artifacts. In areas of images having gradients in which the luminance varies slowly as a function of distance in the resulting image, false contour lines can be introduced. To avoid this artifact, the transform can be applied at a bit depth that is larger than the bit depth of the display and then reduced to a lower bit depth using techniques, such as blue noise dithering which introduces a low contrast, spatially varying, pattern to hide the presence of these contour lines. Therefore, the method of the present invention can further include dithering the drive signals in the shadow range.

A second possible outcome of this increase in the instantaneous slope is to increase the visibility of noise in the shadow range of images. To avoid this artifact, the input image signal can be divided by filtering techniques known in the image-processing art into a high and a low spatial frequency image with the low frequency image having a maximum spatial frequency on the order of 4 cycles per degree of visual angle. The nonlinear transform can be applied 58 to only the low spatial frequency image and the more traditional linear transform can be applied to the high spatial frequency image. By performing this manipulation, the shadow detail can be enhanced in the low spatial frequencies of the images where this manipulation has the most visible impact without substantially increasing the instantaneous slope of the high spatial frequency components of the image, which typically contain unwanted image noise.

The invention has been described in detail with particular reference to certain preferred embodiments thereof, but it will be understood that variations and modifications can be effected within the spirit and scope of the invention.

In a preferred embodiment, the invention is employed in a display that includes Organic Light Emitting Diodes (OLEDs) which are composed of small molecule or polymeric OLEDs as disclosed in but not limited to U.S. Pat. No. 4,769,292, by Tang et al., and U.S. Pat. No. 5,061,569, by VanSlyke et al. Many combinations and variations of organic light emitting materials can be used to fabricate such a display. Referring to FIG. 2, EL emitters 14R, 14G, 14B and 14W can be OLED emitters, EL pixel 16 can be an OLED pixel, and EL display 12 can be an OLED display.

The input image signals and drive signals can be linear or nonlinear, scaled in various ways as commonly known in the art. The input image signals can be encoded according to the sRGB standard, IEC 61966-2-1. The drive signals can be voltages, currents, or times (e.g. in a pulse-width modulation "digital drive" system).

PARTS LIST

2 provide EL display step
4 receive input image signal step
6 transform input image signal step
8 provide drive signal to drive display step
12 EL display
14R red emitter
14G green emitter
14B blue emitter
14W white emitter
16 pixel
18 controller
20 input image signal
22 drive signal
30 demarcation line
32 linear contrast function
34 contrast function
36 maximum display luminance value
38 peak frame luminance value
42 proportion
52 receiving input image signal step
54 determine peak frame luminance step
56 determine contrast function step
58 apply contrast function
60 provide drive signal step
72 convert to linear intensity step
74 compute average linear intensity step
76 determine static image step
78 increment time step
80 calculate peak frame luminance step
82 determine dynamic image step
Parts List—Continued
84 reset time step
91 first sub-function
92 second sub-function
93 tangent point
100 linear contrast function
102 contrast function
104 contrast function
106 contrast function
108 contrast function

110 contrast function
114 linear transform

The invention claimed is:

1. A method for controlling an electroluminescent display to produce an image for display that has reduced luminance to reduce burn-in on the display while maintaining visible contrast, the method comprising:

providing the electroluminescent (EL) display comprising a plurality of EL emitters, the luminance of the light produced by each EL emitter being responsive to a respective drive signal;

receiving a plurality of input image signals for each EL emitter, the input image signals having a peak frame luminance, each input image signal corresponding to a respective one of a plurality of frames;

transforming the input image signals to a plurality of drive signals comprising a reduced peak frame luminance value while maintaining contrast in the displayed image to reduce burn-in by adjusting the drive signals to have reduced luminance provided by each pixel, the transforming comprising:

determining the peak frame luminance based on the time when a static image is displayed;

holding the peak frame luminance constant for i frames after the static image is displayed;

reducing the peak frame luminance by a first exponential function until a time Fs;

once Fs is achieved, peak frame luminance is reduced by a second exponential function; and wherein the drive signals are further adjusted so that a luminance decrease in a shadow range is less than a luminance decrease in a non-shadow range in the displayed image for the drive signals with reduced peak frame luminance.

2. The method according to claim 1, wherein the transforming to a reduced peak frame luminance comprises applying a contrast function to the input image signal to produce the further adjusted drive signals.

3. The method according to claim 2, wherein the contrast function is linear for luminance values greater than 20% of the peak frame luminance value, and nonlinear for values less than 5% of the peak frame luminance value.

4. The method according to claim 2, wherein the contrast function varies as a function of the peak frame luminance value.

5. The method according to claim 2, wherein:

the contrast function comprises a first and a second sub-function;

the first sub-function is used to transform input image signals in the shadow range; and the second sub-function is used to transform input image signals in the non-shadow range.

6. The method according to claim 5, wherein:

the first sub-function is nonlinear; and the second sub-function is linear.

7. The method according to claim 5, wherein the contrast function and its first derivative are both continuous.

8. The method according to claim 5, wherein the first sub-function comprises a quadratic polynomial.

9. The method according to claim 2, wherein the transforming further comprises:

dividing the input image signal into a high and a low spatial frequency image;

applying the contrast function to the low spatial frequency image; and applying a linear transform to the high spatial frequency image.

10. The method according to claim 9, wherein the low frequency image comprises a spatial frequency of ≤4 cycles per degree of visual angle.

11. The method according to claim 1, further comprising dithering the drive signals values in the shadow.

12. The method according to claim 1, wherein:

the EL display comprises an organic light-emitting diode (OLED) display; and each EL emitter comprises an OLED emitter.

* * * * *